US010118516B2

(12) United States Patent
Murray (10) Patent No.: US 10,118,516 B2
(45) Date of Patent: Nov. 6, 2018

(54) VEHICLE SEAT OPERATION FEEDBACK AND CONTROL (71) Applicant: AGCO Corporation, Hesston, KS (US)

(72) Inventor: Timothy Allen Murray, Hesston, KS (US)

(73) Assignee: AGCO Corporation, Duluth, GA (US)

(*) Notice: Subject to any disclaimer, the term of this patent is extended or adjusted under 35 U.S.C. 154(b) by 62 days.

(21) Appl. No.: 15/364,555

(22) Filed: Nov. 30, 2016

(65) Prior Publication Data
US 2017/0158102 A1 Jun. 8, 2017

Related U.S. Application Data (60) Provisional application No. 62/261,938, filed on Dec. 2, 2015.

(51) Int. Cl.
B60N 2/50 (2006.01)
B60N 2/16 (2006.01)
B60N 2/02 (2006.01)

(52) U.S. Cl.
CPC .......... B60N 2/501 (2013.01); B60N 2/0244 (2013.01); B60N 2/16 (2013.01); B60N 2/505 (2013.01); B60N 2002/0268 (2013.01); B60N 2002/0272 (2013.01)

(58) Field of Classification Search
CPC ........ B60N 2/501; B60N 2/0244; B60N 2/16; B60N 2/505; B60N 2002/0268; B60N 2002/0272
See application file for complete search history.

(56) References Cited

U.S. PATENT DOCUMENTS

| 4,547,718 | A | * | 10/1985 | Ratzel | B60N 2/0224 318/103 |
| 5,015,933 | A | * | 5/1991 | Watkins | A63G 31/16 318/567 |
| 5,536,059 | A | * | 7/1996 | Amirouche | B60N 2/501 188/266.1 |
| 6,070,681 | A | * | 6/2000 | Catanzarite | B60G 99/008 180/89.15 |
| 6,976,708 | B2 | * | 12/2005 | Aoki | B60R 22/44 280/807 |
| 9,481,466 | B2 | * | 11/2016 | Fischer | B60N 2/919 |
| 2006/0103193 | A1 | * | 5/2006 | Kramer | B64D 11/06 297/217.3 |
| 2007/0111774 | A1 | * | 5/2007 | Okada | A63F 13/08 463/16 |
| 2007/0265754 | A1 | * | 11/2007 | Curtis | B60N 2/005 701/49 |
| 2008/0161989 | A1 | | 7/2008 | Breed | |

(Continued)

FOREIGN PATENT DOCUMENTS

DE  10233503 A1  2/2004
EP  2163420 A2  3/2010

OTHER PUBLICATIONS

UK Intellectual Property Office, International Search report for related UK application No. GB1601890.5, dated Jul. 12, 2016.

(Continued)

Primary Examiner — Calvin Cheung (57) ABSTRACT

A vehicle seat operation feedback and control system with a seat and an electronic display screen and a processor configured to receive a signal from the seat corresponding to an inoperable, almost inoperable, or undesired condition and provide feedback on the display screen of the inoperable, almost inoperable, or undesired condition.

17 Claims, 8 Drawing Sheets

(56) References Cited

U.S. PATENT DOCUMENTS

| | | | | |
|---|---|---|---|---|
| 2009/0088930 | A1* | 4/2009 | Ohtsubo | B60N 2/0252 701/49 |
| 2010/0107121 | A1* | 4/2010 | Kawachi | B60N 2/0228 715/823 |
| 2010/0253498 | A1 | 10/2010 | Rork et al. | |
| 2010/0295349 | A1* | 11/2010 | Schaal | B60N 2/002 297/216.12 |
| 2012/0245491 | A1* | 9/2012 | Amell | A61B 5/6893 600/595 |
| 2013/0176019 | A1* | 7/2013 | Bauer | B64D 11/0015 324/207.17 |
| 2014/0163774 | A1* | 6/2014 | Demeniuk | G08C 17/02 701/2 |
| 2014/0218307 | A1* | 8/2014 | Goldman-Shenhar | G06F 3/0488 345/173 |
| 2014/0358378 | A1* | 12/2014 | Howard | B60N 2/501 701/45 |
| 2016/0034146 | A1* | 2/2016 | Daly, Jr. | G06F 3/04842 715/735 |
| 2016/0304207 | A1* | 10/2016 | Carles | B64D 11/0015 |
| 2018/0065504 | A1* | 3/2018 | Lan | B60N 2/002 |

OTHER PUBLICATIONS

Frank Himmelhuber, Active Pneumatic Suspensions for the Tractor Seat, Landtecnik, Mar. 2006, pp. 132-133, located @ https://www.landtechnik-online.eu/ojs-2.4.5/index.php/landtechnik/article/viewFile/2006-3-132-133/1826.

Unknown, Magnetorheological Seat Suspension Development Problems, as published @ http://scholar.lib.vt.edu/theses/available/etd-11997-164941/unrestricted/Chapter1.pdf.

* cited by examiner

VEHICLE SEAT OPERATION FEEDBACK AND CONTROL

CROSS REFERENCE TO RELATED APPLICATION

This application claims the benefit of U.S. Provisional Application No. 62/261,938 filed Dec. 2, 2015, which is hereby incorporated by reference in its entirety.

TECHNICAL FIELD

The present disclosure is generally related to vehicle seats and, more particularly, to a feedback system about vehicle seat operation.

BACKGROUND

Vehicle seats have evolved over the years to improve the comfort and safety of an operator of the vehicle. Features such as lumbar adjustment, heated or ventilated seats, and seat positioning, among other features, are available for a multitude of commercial and consumer vehicles. In some industries, such as the agricultural industry, operator comfort is of particular importance in view of the length of time an operator may spend behind the controls. However, the evolution of so many features in a seat also comes at a cost of complexity, which may introduce or add a layer of confusion in an environment (e.g., an agricultural vehicle cab) that is laden with an ever-increasing quantity of controls.

BRIEF DESCRIPTION OF THE DRAWINGS

Many aspects of a vehicle seat operation feedback and control system can be better understood with reference to the following drawings. The components in the drawings are not necessarily to scale, emphasis instead being placed upon clearly illustrating the principles of certain embodiments of the system. Moreover, in the drawings, like reference numerals designate corresponding parts throughout the several views.

DESCRIPTION OF EXAMPLE EMBODIMENTS

Overview

In one embodiment, a vehicle seat operation feedback and control system, comprising: a seat with a plurality of components; an electronic device comprising a display screen; and a processor configured to: receive a signal from the seat corresponding to an inoperable, almost inoperable, or undesired condition for a component among the plurality of components; and provide feedback on the display screen of the inoperable, almost inoperable, or undesired condition.

DETAILED DESCRIPTION

Certain embodiments of a vehicle seat operation feedback and control system are disclosed that provide an operator with feedback of the operational status of the seat upon which the operator is seated. For instance, an embodiment of a vehicle seat operation feedback and control system receives signals corresponding to an undesirable or inoperable (or almost inoperable) condition of one or more components in the seat, and provides feedback of that condition to an operator. The feedback may be a description of the undesirable or inoperable condition, including an identification of the offending component(s) and its corresponding location in or on the seat, and/or instructions on how to correct the condition. The feedback may be presented, in the form of a visual representation (e.g., graphic) of the seat and component(s), on a display screen of a virtual terminal located proximally to the operator, or as text (e.g., presented on a display screen without the graphic of the seat), or a combination of both graphics and text. By presenting the feedback, the operator is alerted to the presence of the condition and a recommended corrective action.

Digressing briefly, some seats have diagnostics built into their controllers that flash lights (e.g., light emitting diodes) that indicate the status of certain components of the seat, such as the settings and/or deviations from operations according to those settings. Though such built-in diagnostics may be helpful to service technicians, the operator is typically unaware of the diagnostics (e.g., which may be obscured from view unless a panel is removed) or, when observable, the meaning behind the flashing lights. In some circumstances, an operator may even be unaware of certain seat functionality, and hence the presence of an inoperable condition may also go unnoticed, or the operator may complain about the perceived quality of the ride without recognizing that a problematic condition exists. Another issue that may arise with some seats involves the feature of auto-height adjustment. For instance, some seat manufacturers provide for auto-adjust functionality for seat suspension, which enables an operator to always be vertically-positioned in the middle of the suspension stroke. Unfortunately, this auto-adjustment occurs regardless of the height and/or weight of the operator. Thus, a short person may be positioned too high (e.g., where his or her legs are not touching the floor), or a tall person positioned too low (e.g., where his or her knees and chest may be too close together). Some seats are equipped with a visual indicator on the seat to assist the operator in centering his or herself in the suspension stroke. Yet, in some instances, if the seat is manually adjusted out of this range, the controls for the seat cause the suspension to be adjusted to the middle position in opposition to the preference of the operator. Also, other seat functionality and the ability to adjust such functionality is often unknown to the operator, which may result in less favorable perceptions of vehicle (or seat) performance. In certain embodiments of a vehicle seat operation feedback and control system, the operator is provided with feedback to provide awareness of the functionality of the seat as well as when inoperable (or almost inoperable) or undesirable conditions occur, enabling an improved riding experience and/or improved safety. In some embodiments, the suspension position is monitored and feedback to the operator is provided via the display screen to help the operator improve his or her riding experience and/or improved safety.

Having summarized certain features of a vehicle seat operation feedback and control system, reference will now be made in detail to the description of certain embodiments of a vehicle seat operation feedback and control system as illustrated in the drawings. While embodiments of a vehicle seat operation feedback and control system will be described in connection with these drawings, there is no intent to limit it to the embodiment or embodiments disclosed herein. For instance, though emphasis is placed on an arrangement for an agricultural vehicle, certain embodiments of a vehicle seat operation feedback and control system (or the principles thereof) may be beneficially deployed in other vehicles, such as vehicles for other industries (e.g., construction, mining, recreational, etc.), passenger vehicles, etc. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description. In some embodiments, features described for one embodiment may be combined with features of another embodiment.

Note that references hereinafter made to certain directions, such as, for example, "front", "rear", "left" and "right", are made as viewed from the rear of a vehicle looking forwardly.

Figure 1:
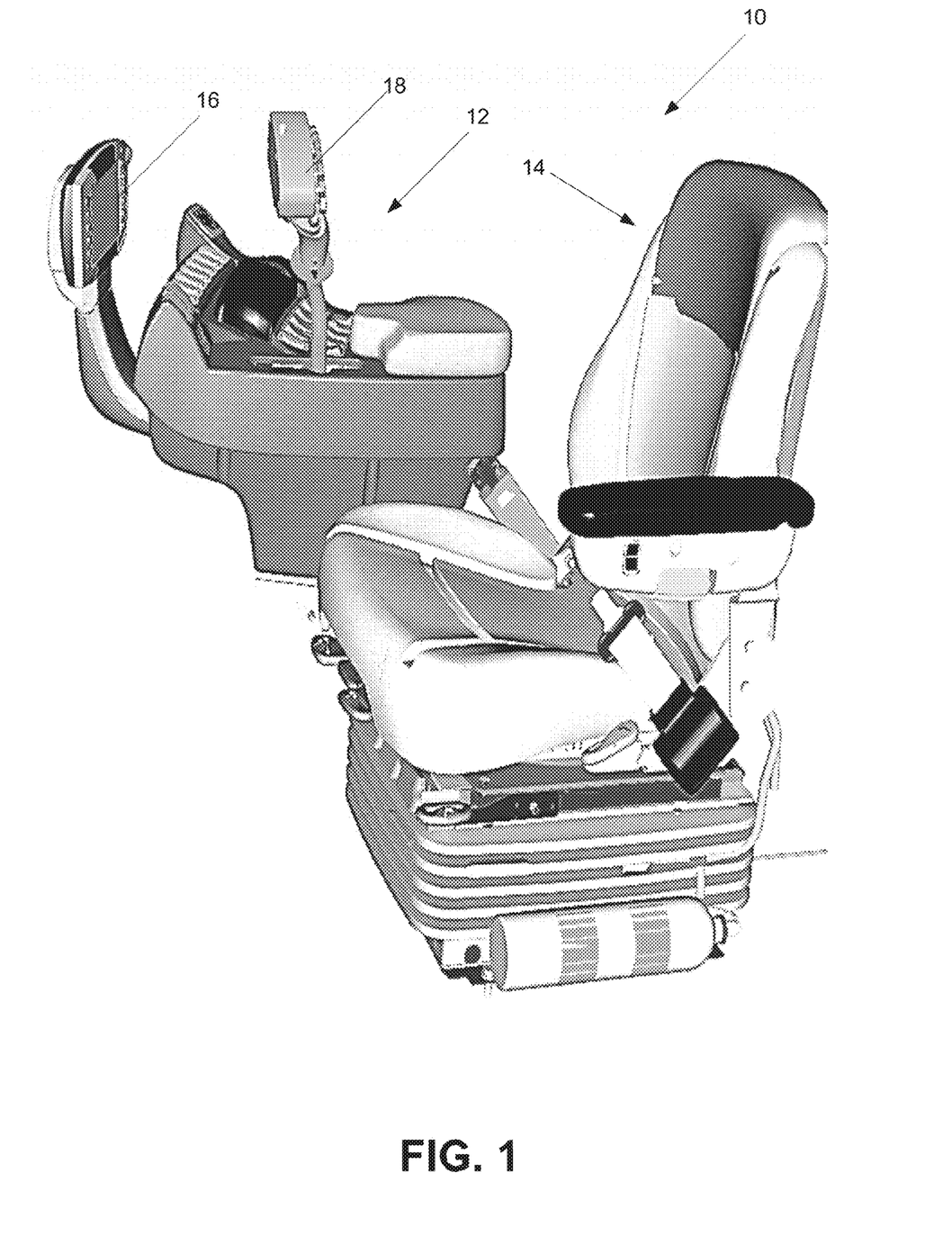
FIG. 1 is a schematic diagram that illustrates an embodiment of an example vehicle seat operation feedback and control system.

Reference is made to FIG. 1, which illustrates an embodiment of an example vehicle seat operation feedback and control system 10. The vehicle seat operation feedback and control system 10 comprises a console 12 and a seat 14 in proximity to the console 12. The vehicle seat operation feedback and control system 10 may be located in a cab of vehicle, such as an agricultural vehicle (e.g., tractor, sprayer, combine harvester, etc.) or other vehicles in some embodiments. In some embodiments, the vehicle seat operation feedback and control system 10 may contain fewer components, and in some embodiments, additional components. The console 12 comprises a virtual terminal 16 embodied as a computing device and a display screen, and a multi-functional handle 18 that enables an operator to control navigation of a vehicle, among other functions. Note that the virtual terminal 16 (or herein also referred to merely as a terminal or electronic device) may be located elsewhere in some embodiments, such as coupled to the seat 14. The seat 14 may be of known construction, with additional circuitry to enable transmission and/or reception (via a wired or wireless communications medium) of signals (e.g., analog and/or digital data communication) communicated between the virtual terminal 16 and the transmission and/or reception functionality in the seat 14. For instance, the seat 14 may be embodied as a Grammer Maximo model of seat (or similar) with one or more known features such as electronically-active-controlled, air suspension and electronically-controlled suspension positioning, climate control, air-assisted height adjustment, shock absorbers, fore and aft isolators, adjustable damper, electronic weight adjustment, operator presence switch, and pneumatic lumbar support, among other known-features. It should be noted that the type of suspension system used in the seat 14 may be embodied as a passive, active, or semi-active suspension system. For instance, in some embodiments, seats that operate according to a semi-active suspension control system may be implemented, such as when the seat is embodied as a Sears 5000 series model. In such embodiments, as the vehicle traverses the surface, a position sensor feeds a seat controller with real-time changes in surface conditions. The seat controller interprets the conditions and responsively sends electric pulses to a magneto-rheological (MR)-fluid filled damper, which changes the viscosity to update the damping requirements and hence the firmness of the ride. The seat 14 may have firmness controls that enable one of a plurality of firmness profiles to be selected by the operator. Other features include one or more of the features referenced above for the Grammer style seats 14. Certain embodiments of a vehicle seat operation feedback and control system 10 may use other brands or types of seats with the same or different features than described above, and are contemplated to be within the scope of the disclosure.

Figure 2:
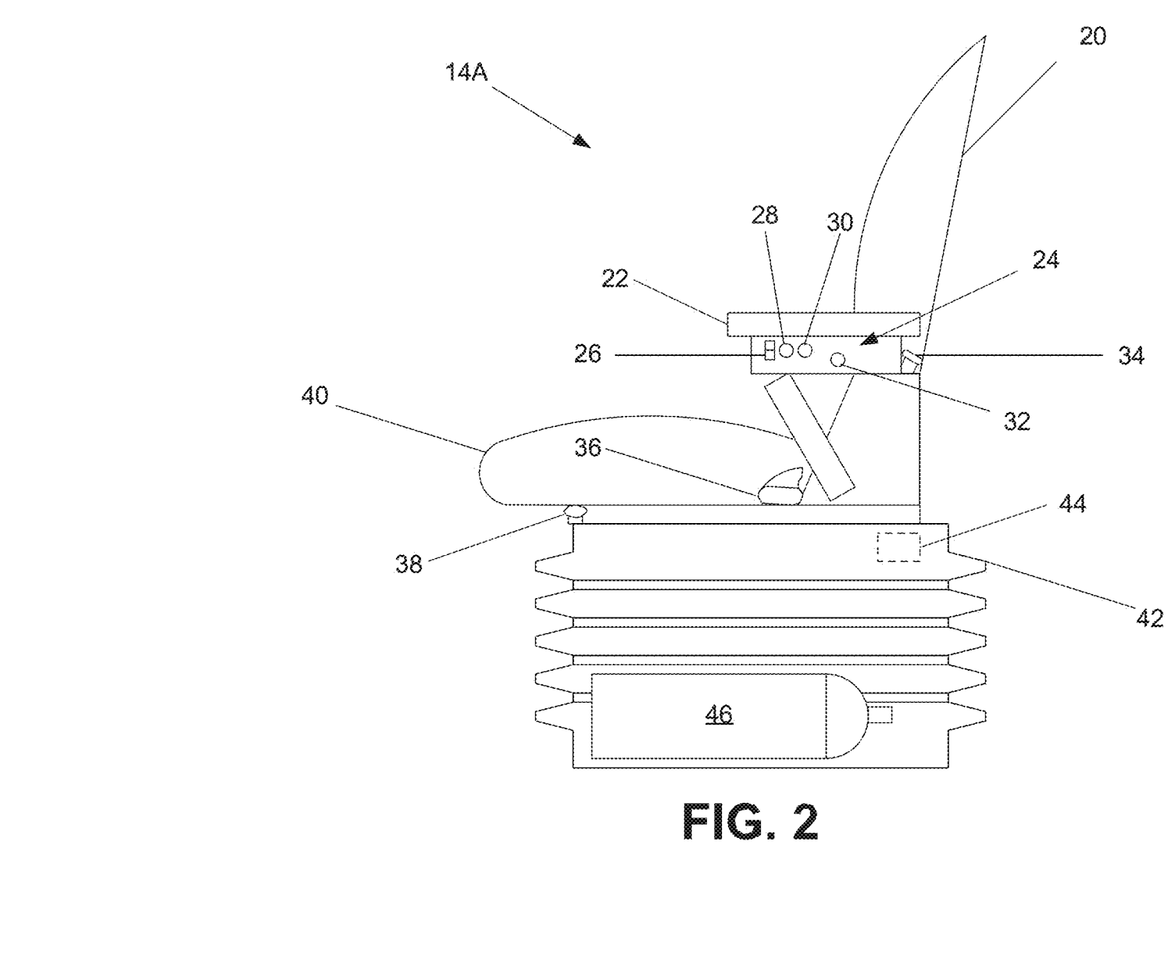
FIG. 2 is a schematic diagram that illustrates, in fragmentary, side-elevation view, an example seat of an embodiment of a vehicle seat operation feedback and control system.

Referring now to FIG. 2, shown is a fragmentary schematic diagram of an example seat 14A that may be used in an embodiment of a vehicle seat operation feedback and control system 10 (FIG. 1). It should be appreciated that the seat 14A depicted in FIG. 2 is for illustrative, example purposes, and that other seats with the same or different features may be used in some embodiments. The seat 14A comprises a cushioned backrest 20 that is tapered in side-elevation view, an armrest 22 with seat control switches 24 (e.g., on the side of the armrest 22, but not limited to that location) that in one embodiment are electronic-based, and that may be activated by an operator to enable the operator to adjust the comfort of his or her ride. For instance, a first switch 26 may be used to prompt adjustment of a height of the seat, a second switch 28 and third switch 30 may be used to prompt adjustment of seat climate (heat and vent fans, respectively), and a fourth switch 32 may be used to prompt adjustment of seat firmness. Note that the above-description for the switches is one example among many. For instance, mechanical and/or mechanical/electrical switches may be used in some embodiments. According to the seat design of at least one manufacturer, a mechanical/electrical switch is used for seat adjustment, wherein if pressed to achieve a raised position, the switch electrically signals a compressor to operate to raise the seat, and when pressed to lower the seat, mechanically actuates an air valve in the switch in the armrest that releases air from the suspension and lowers the seat. The seat 14A may also comprise other controls, such as mechanical levers or dials. For instance, the seat 14A may comprise a lumbar adjustment control 34, a backrest tilt control 36, and a fore-and-aft slide control 38. It should be appreciated that other known controls may be used (e.g., armrest tilt, cushion tilt, cushion extension, backrest adjust angle, swivel, fore-and-aft isolation, lateral isolation, etc.), the description of which is omitted here for brevity. The seat 14A further comprises a seat cushion 40, which resides upon a suspension base 42 that, depending on the manner of suspension, may house dampers, shock absorbers, springs, magneto-rheological fluid components (e.g., in the case of semi-active suspension embodiments), actuators (e.g., electric, hydraulic, pneumatic, etc.), among other known components that enable firmness adjustment and adjustments in seat height, among other functions of the seat 14A. In some embodiments, a controller 44 may be located within the frame of the seat 14, with one or more light emitting diodes (LEDs) that enable a service technician to remove a panel and perform diagnostics on malfunctions or inoperable conditions of the seat 14A by visually inspecting the light pattern of the LED(s). That is, the controller 44 may comprise one or more light-emitting diodes (LEDs) with different flash patterns corresponding to respective one or more conditions. For instance, for a single LED controller, an LED off indicates no power to the controller or a bad controller board. As another example, an LED on continuously may indicate that there is no damper connection, or a bad damper coil. Also, a flashing LED may indicate a bad controller board. It should be appreciated that these indicators are examples, and that other forms of visual representation may be used to indicate these and/or other conditions. The seat 14A further comprises an air tank 46 to provide added air spring volume to facilitate damping of vibration frequencies in conjunction with the seat suspension.

Figure 3:
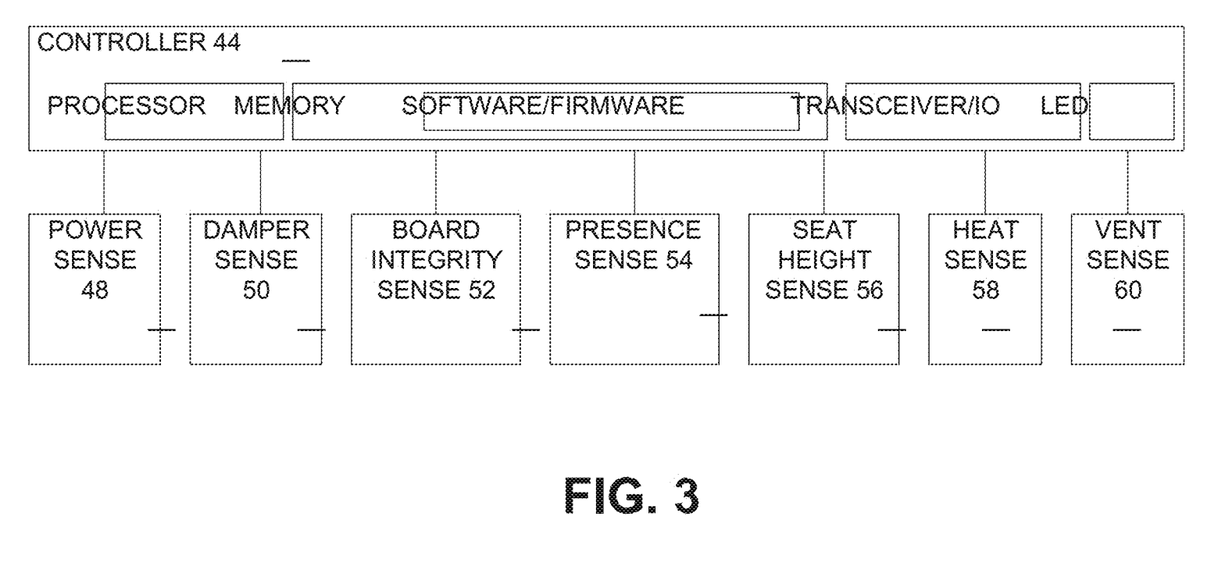
FIG. 3 is a functional block diagram that illustrates an example arrangement of a sensing network and controller residing in an example seat of an embodiment of a vehicle seat operation feedback and control system.

FIG. 3 shows a functional block diagram that illustrates an example arrangement of a seat controller 44 and a sensing network associated with respective seat components and in communication with the controller 44. It should be appreciated by one having ordinary skill in the art in the context of the present disclosure that the sensing network may include fewer or additional functionality in some embodiments. The controller 44 may comprise circuitry that includes a processor, memory with software/firmware, a transceiver and/or input/output (I/O) interface, and optionally one or more LEDs. The software/firmware (hereinafter, collectively software) may be executed by the processor to interpret the input from the sensing network and execute control commands to control devices (e.g., actuators) of certain seat components to enable the respective seat functionality. The software may also provide communication functionality, such as to enable the communication (e.g., messaging over a controller area network (CAN) bus) by the transceiver with the virtual terminal 16 (FIG. 1). The software may also be used in conjunction with the processor to enable diagnostics of various seat and controller board components, such as manifested by flashing a light pattern using the LED(s). In some embodiments, the LED(s) may be omitted, such as where service-assist diagnostics are unavailable.

The sensing network may comprise a plurality of sensors including a controller power sense 48, damper sense 50, board integrity sense 52, presence sense 54 (e.g., presence of an operator), seat height sense 56, heat sense 58 (e.g., of seat temperature), and vent sense 60 (e.g., seat ventilation). In some embodiments, fewer, additional, and/or different sensor functionality may be used. The aforementioned sensing network may communicate with the controller 44 via a wired or wireless medium, and in one embodiment, the controller 44 and sensing network are all co-located within and/or on the seat frame. In some embodiments, one or more of the sensors of the sensing network may be located externally and proximal to the seat 14A. The seat 14A may receive power via an external battery source serving a 12 VDC supply (though in some embodiments, other voltage supplies may be used, such as 24 VDC), with the power sense 48 comprising circuitry to sense current and/or voltage and resistance that collectively are used to detect or derive the presence of power to the seat 14A. The damper sense 50 may comprise one or more position sensors that, in cooperation with the controller software, provide an indication of the suspension stroke position and range of operation. The software in the controller 44 may also store a plurality of firmness profiles that control a speed of the fluid through the shock absorber (to give a firmer or softer ride for the operator) based on the profile that is selected by the operator via the firmness control switch 32 (FIG. 2) located on the frame of the armrest 22 (FIG. 2). In some embodiments, other mechanisms may be used to control the firmness. The board integrity sense 52 may comprise one or more fuses or switches that, when triggered, alert (e.g., cause signaling to) the controller processor of a short, severed wire, worn part, or other inoperable or almost inoperable condition of the electronics of the controller 44. The presence sense 54 may comprise a seat switch (e.g., pressure switch) that detects when a load is present on the seat cushion 40 (FIG. 2). In some embodiments, the presence of an operator may be detected using an imaging device, such as a camera. The seat height sense 56 may comprise one or more position sensors that detect the height of the seat. The heat sense 58 may comprise one or a plurality of thermocouples or thermistors that sense the seat temperature, though in some embodiments, sensor functionality may merely determine whether the heater is off or on. The vent sense 60 detects whether the fan is inoperable, such as a motion detector or current load sensor. The sensing network of the various seats available today is well-known, and hence further discussion is omitted for brevity.

Figure 4A:
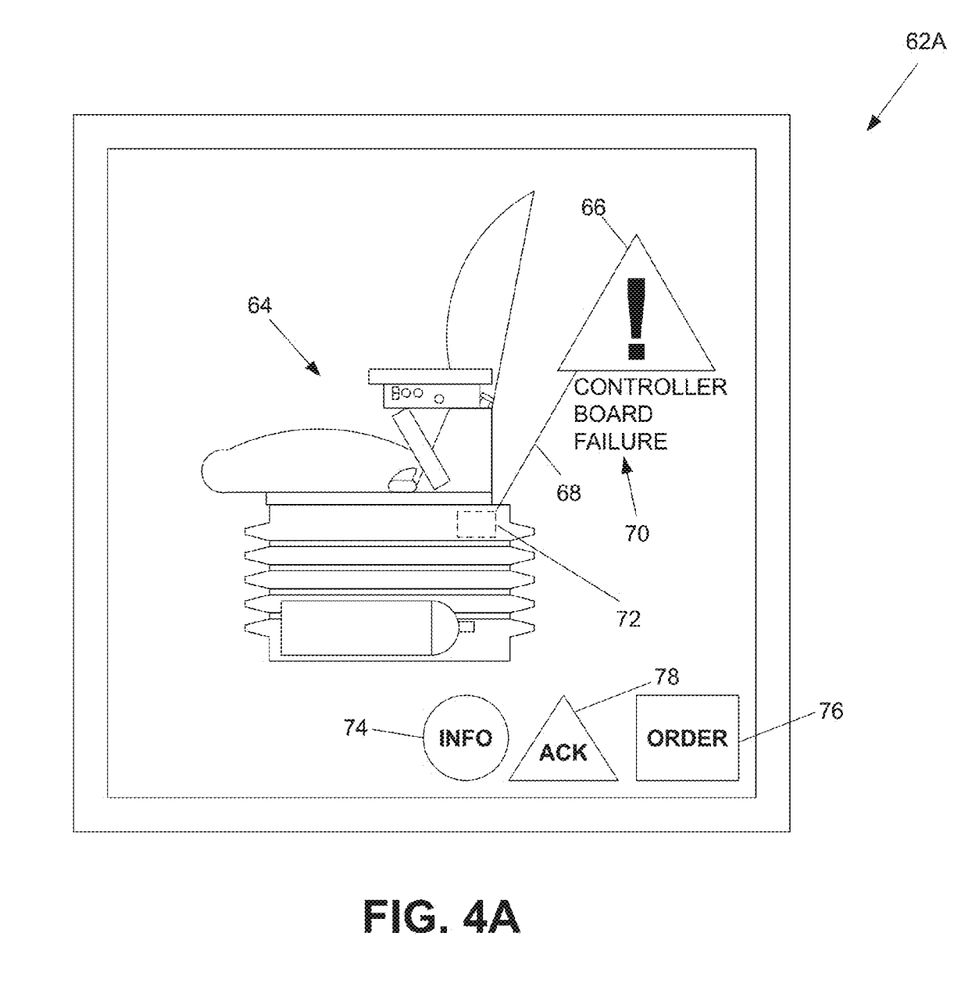
FIGS. 4A-4C are schematic diagrams that illustrate example display screens and corresponding example feedback used in an embodiment of a vehicle seat operation feedback and control system.
Figure 4B:
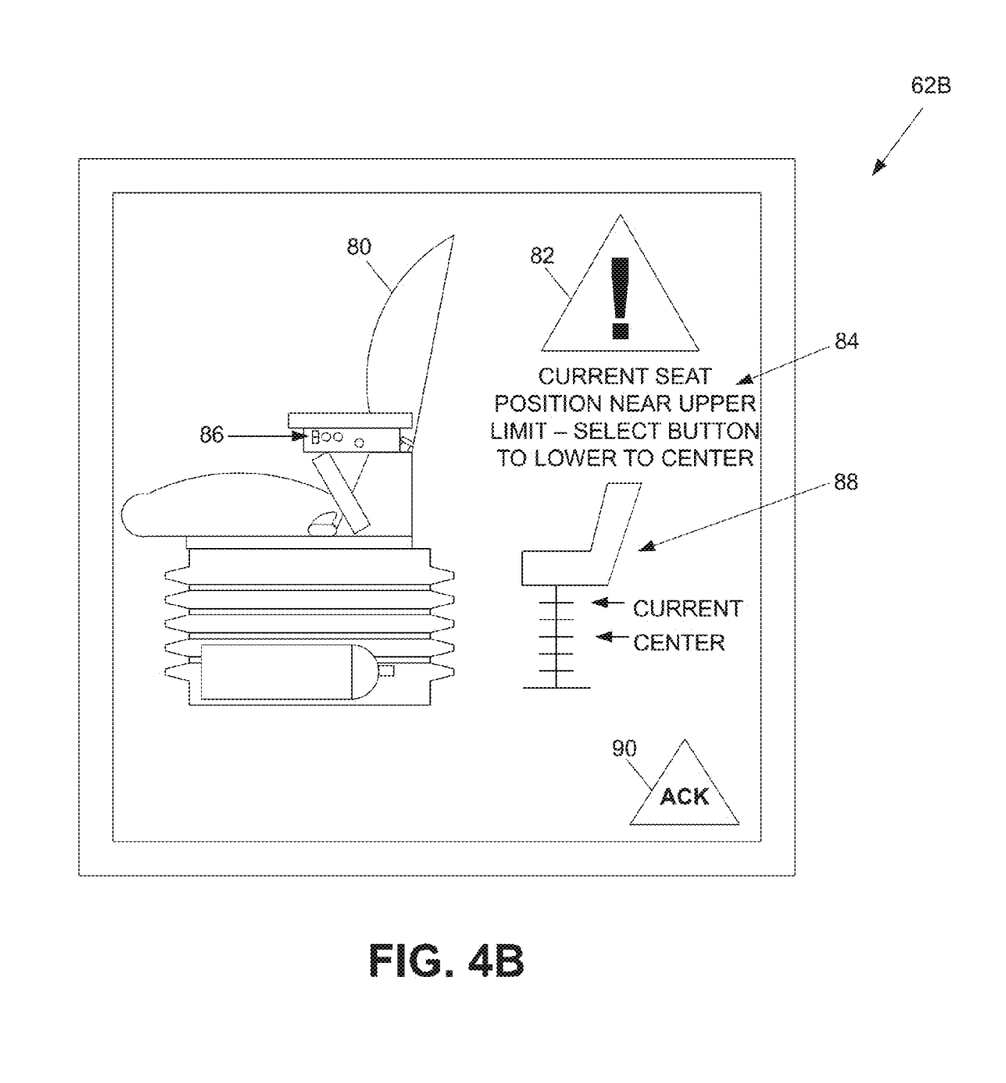
Figure 4C:
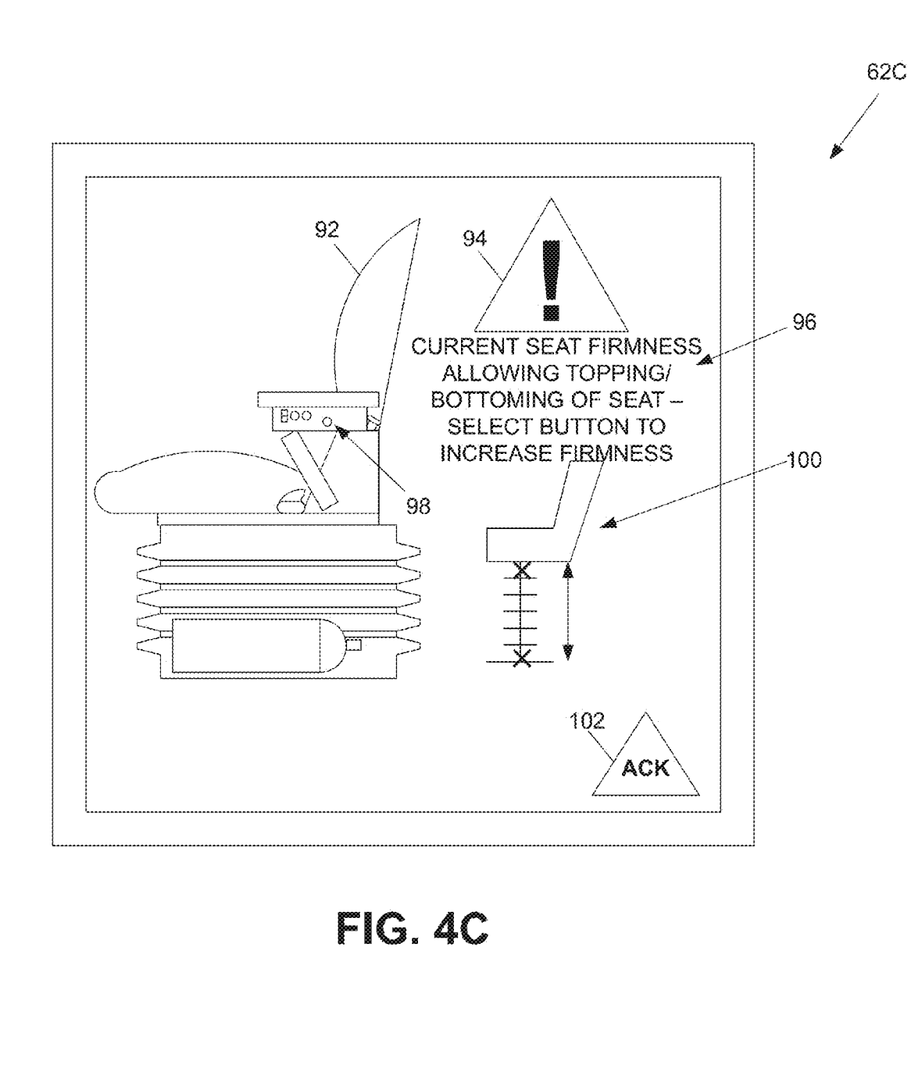

Attention is directed now to FIGS. 4A-4C, which illustrate some example display screens and corresponding example feedback used in an embodiment of a vehicle seat operation feedback and control system 10. It should be appreciated by one having ordinary skill in the art in the context of the present disclosure that the visual depictions in the example display screens are merely illustrative, and that there may be differences in format and/or in general, the visual appearance may be different in some embodiments and hence are contemplated to be within the scope of the disclosure. Referring to FIG. 4A, shown is a display screen 62A, which may be part of (e.g., integrated with or co-located and communicatively coupled to) an electronic device or apparatus embodied as the virtual terminal 16 (FIG. 1). In some embodiments, the display screen may be a component of another electronic device, such as a portable wireless communications device (e.g., a smartphone that wirelessly (or in some embodiments, over a wired medium, such as a USB connection) receives signals from the controller 44 and/or the sensing network of FIG. 3 via near field communications, Bluetooth technology, among other wireless specifications. The electronic device may be in the possession of the operator (e.g., held by the operator). In some embodiments, the electronic device may be in the form of other types of devices, such as an immersive headset.

In certain embodiments of a vehicle seat operation feedback and control system 10 (FIG. 1), an operator is provided with feedback via the virtual terminal 16 (FIG. 2), or other electronic device, alerting the operator of an inoperable (or almost inoperable) condition that has occurred in the seat 14A (FIG. 2) and providing additional information. For instance, the feedback may be in the form of a visual indication presented on the display screen 62A that alerts the operator to a failing component or component failure in the seat and an identification of that component. An identification of the inoperable (or almost inoperable) components in the seat may be communicated via the controller 44, such as over a CAN bus and/or wirelessly. For instance, the controller 44 may receive an indication of component inoperability via the associated sensor of the sensing network. In some embodiments, the sensors of the sensing network may be directly coupled along a CAN bus (e.g., configured as nodes), enabling direct monitoring by the virtual terminal 16 of the sensing network (and hence status of the operation of the seat components). The virtual terminal 16 may choose to ignore some communications (such as where the initial condition was sent and subsequent signals merely repeat the initial condition, or where the operator previously and recently over-rode the recommendation of the virtual terminal 16), or present an indication and description of the condition on the display screen 62 for the operator to read. The visual presentation to the operator via the display screen 62A provides the operator with the information needed to fix or address the condition in a timely manner, versus conventional systems where the operator may be unaware of the component functionality or unaware that there is a problem with the component. The presentation to the operator on the display screen 62A may also serve to improve component life, reduce fatigue to the operator, or possibly reduce the risk of bodily harm (e.g., seats topping or bottoming out).

As shown in FIG. 4A, the vehicle seat operation feedback and control system 10 (FIG. 1) provides a graphic 64 (e.g., real image or computer-generated graphic) of the seat 14A (FIG. 2) and a warning icon 66 that points (with a reference line 68) to the location of the failed component and further is associated with accompanying text 70 that identifies the failed component and the inoperable (or almost inoperable) condition (e.g., controller board failure, as identified by graphic 72). Note that the graphic 64 is presented in side-elevation view, but may be presented in alternative views or a view that is based on the best view from the perspective of the operator of the condition or inoperable (or almost inoperable) component. In some embodiments, the view may be adjusted by the operator (e.g., to enable a zoom-in function, or change in perspective, or exploded view). In some embodiments, the accompanying text 70 may include a replacement part number, as well as other information to facilitate the order and/or replacement of the inoperable component (e.g., such information including one or any combination of local dealer name, identity of a dealer contact and contact information, etc.). In the depicted embodiment, the operator may select (directly on the display screen 62A, or indirectly as prompted by the information on the display screen 62A via a keyboard on the virtual terminal 16 or elsewhere, or via other known mechanisms, such as mouse, microphone, etc.) the information button icon 74 to receive such additional information and the order button icon 76 to order a replacement part. In some embodiments, such additional information may be presented on the same screen as the alert. The display screen 62A further shows an acknowledgement (ACK) button icon 78 that the operator may select (e.g., directly or indirectly) to acknowledge the alert. In some embodiments, the warning icon 66 may be presented without the reference line 68, the alert instead visually highlighting the failed component (e.g., change of color, overlapped on the seat graphic 64, etc.) to enable an identification of its location as well as its identity. In some embodiments, the warning icon 66 may itself serve as a link that is selectable to learn more about the component, the inoperable condition, and/or other information (e.g., ordering and/or replacement information). In some embodiments, a graphic of the seat 14A may not be presented, and only a textual warning that comprises an identifier of a component part that is detected as inoperable and a description of its location in the seat 14A. These and/or other combinations of icons, descriptive text, button icons, and/or links of the same or different visual appearance than depicted in FIG. 4A may be used in some embodiments.

Although the communication of the inoperable (or almost inoperable) condition may be visually (or in some embodiments, audibly or a combination of visually and audibly) presented to the operator via the virtual terminal 16, in some embodiments, the condition and/or other information may alternatively, or additionally, be sent to a remote device. For instance, other personnel or another entity (i.e., other than the operator) may be responsible for maintenance and/or ownership of the vehicle, and hence the inoperable or almost inoperable condition (or a continuous monitoring of all conditions of the components) may be sent using telemetry capabilities (e.g., cellular modem) of the virtual terminal 16 (or the telemetry capabilities of a device in local communication with the virtual terminal 16 in some embodiments) to a remote server that presents the conditions to the other entity or personnel. As another example, the virtual terminal 16 may wirelessly communicate (e.g., using telemetry capabilities of the virtual terminal 16 or coupled device) a purchase order automatically in response to the detected inoperable condition, or in some embodiments, after providing the operator an opportunity to allow or disallow the order for the component that had the condition that prompted the alert. Although an illustration of an inoperable controller board is illustrated, it should be appreciated that any of the components having a corresponding sensor among the sensing network depicted in FIG. 3 (or other components that have operations that may be monitored) may cause the vehicle seat operation feedback and control system 10 to present a visual representation of the condition and associated component information to a device that is external to the seat 14A.

Before referring now to FIG. 4B, as indicated previously, some seats available today provide functionality for auto adjustment of the seat suspension so that the operator is seated always in a position corresponding to the middle of the suspension stroke, regardless of operator height and/or weight. Certain embodiments of a vehicle seat operation feedback and control system 10 monitor the suspension position and urge the operator to adjust the position if desired. Also, in some embodiments, the vehicle seat operation feedback and control system 10 monitors the movement and position of the seat while the vehicle is in motion and provides alerts and/or suggestions to the operator that may improve ride quality. For instance, as depicted in FIG. 4B, the vehicle seat operation feedback and control system 10 (FIG. 1) presents on a display screen 62B (e.g., of the virtual terminal 16, FIG. 1 or other electronic device) a graphic 80 of the seat 14A (FIG. 2) and a warning icon 82 with accompanying text 84 that the current seat position is near an upper range limit, with further suggestion to select the button referenced by a reference line 86 (corresponding to the height adjustment switch 26 (FIG. 2) to center the seat height position. For instance, the controller 44 (FIG. 3), or one of the sensors of the sensing network (e.g., seat height sense 56) may communicate the height information (e.g., current seat height, center seat height, historical seat height, operator-configured seat height) to the virtual terminal 16 (FIG. 1), or otherwise be available for access by the virtual terminal 16. In some embodiments, some of the information (e.g., one or more of center, historical or desired seat height) may be stored in memory of the virtual terminal 16. In some embodiments, the reference line 86 may be omitted, and the button to be selected by the operator visually distinguished or otherwise highlighted (e.g., with a change in color or size, etc.). Optionally-presented in the display screen 62B is an additional graphic 88 that conceptually illustrates to the operator an undesirable condition (e.g., the height of the seat close to an upper range limit, which may result in the seat topping out and cause the operator to experience a reduction in comfort), with the current position of the seat relative to a center position. The display screen 62B may further present an acknowledgement (ACK) button icon 90 that the operator may directly (or indirectly) select to acknowledge the condition. Note that in some embodiments, the vehicle seat operation feedback and control system 10 may automatically position the seat (e.g., by sending control signals to the controller 44 or directly to the component part actuator in some embodiments), which in some embodiments the vehicle seat operation feedback and control system 10 may present a request for permission on the display screen 62B (to be permitted by operator acknowledgement, or denied) to perform this function before actually causing the seat adjustment. In either case, the operator is presented with more information about the condition of various functionality and/or conditions of the seat 14A or its component parts than is available in conventional systems. Note that variations to what is presented to the operator, similar to the variations described above for FIG. 4A, may be implemented in some embodiments, and are contemplated to be within the scope of the disclosure.

As another example illustration, and referring to FIG. 4C, the vehicle seat operation feedback and control system 10 presents on a display screen 62C (e.g., of the virtual terminal 16, FIG. 1 or other electronic device) a graphic 92 of the seat 14A (FIG. 2) and a warning icon 94 with accompanying text 96 that the current seat firmness setting is causing an undesirable condition (e.g., enabling the topping and/or bottoming out of the seat 14A), with further suggestion to select the button referenced by a reference line 98 (corresponding to the firmness control switch 32 (FIG. 2) to increase the firmness of the seat suspension. Note that the firmness condition may be one where the firmness is too stiff (with the seat suspension operating in a limited range of the total stroke capability), which condition prompts an alert and accompanying corrective and/or identifying information. Note that the results of the adjustments by the operator may also be fed back to the display screen 62C, such as showing whether the button has been manipulated in the proper direction and/or a graphic or text of the resulting performance. In some embodiments, the information presented on the display screen 62C may provide further direction (e.g., press on the upper or lower portion of the button, turn counter-clockwise or clockwise, etc.) as to how the operator is to manipulate the buttons, etc. to achieve the proper adjustment. Note that the controller 44 (FIG. 3), or one of the sensors of the sensing network (e.g., damper sense 50), may communicate the firmness information (e.g., current firmness setting, stroke range detected, historical firmness settings, operator-configured firmness setting) to the virtual terminal 16 (FIG. 1), or otherwise be accessed by the virtual terminal 16. In some embodiments, some of the information (e.g., one or more of historical or desired firmness) may be stored in memory of the virtual terminal 16. In some embodiments, the reference line 98 may be omitted, and the button to be selected by the operator visually distinguished or otherwise highlighted (e.g., with a change in color or size, etc.). Optionally-presented in the display screen 62C is an additional graphic 100 that conceptually illustrates to the operator an undesirable condition (e.g., the current firmness setting is not enough to prevent the topping out and bottoming out of the seat as illustrated by the "X"s at the upper and lower limits of the detected range of stroke travel (represented with a double-headed arrow)). The display screen 62C may further present an acknowledgement (ACK) button icon 102 that the operator may directly (or indirectly) select to acknowledge the condition. Note that in some embodiments, the vehicle seat operation feedback and control system 10 may automatically adjust the firmness of the suspension (e.g., by sending control signals to the controller 44 or directly to the component part actuator in some embodiments), which in some embodiments the vehicle seat operation feedback and control system 10 may present a request for permission on the display screen 62C (to be permitted by operator acknowledgement, or denied) to perform this function before actually causing the firmness adjustment. Note that variations to what is presented to the operator, similar to the variations described above for FIG. 4A, may be implemented in some embodiments, and are contemplated to be within the scope of the disclosure.

It should be noted that although the examples above focus on inoperable and undesirable conditions, certain embodiments of a vehicle seat operation feedback and control system 10 may also present feedback to the operator for conditions that are almost inoperable (e.g., failing). For instance, the controller 44 (FIG. 3) may monitor for leaks in the system (e.g., air pressure of the air tank 46, FIG. 2, for instance), and after a threshold drop in pressure, set a flag that is accessed by the virtual terminal 16 (FIG. 1), or communicated to the virtual terminal 16, which prompts the virtual terminal to present a graphic and/or text that warns that there is a leak in air from the tank 46 and that the air tank 46 should be replaced soon. In some embodiments, the leak may (additionally or in lieu of the source of leak previously mentioned) comprise a leak in fittings and/or an air line, and the virtual terminal presents a graphic and/or text alerting the operator of the leak, its location, and a list of options for fixing the leak (or what items may have failed to prompt the operator to further investigate). Other indications of component wear may be monitored, such as suspension stroke variances for known settings and loads, voltage drop variations, current draw, etc.

Figure 5:
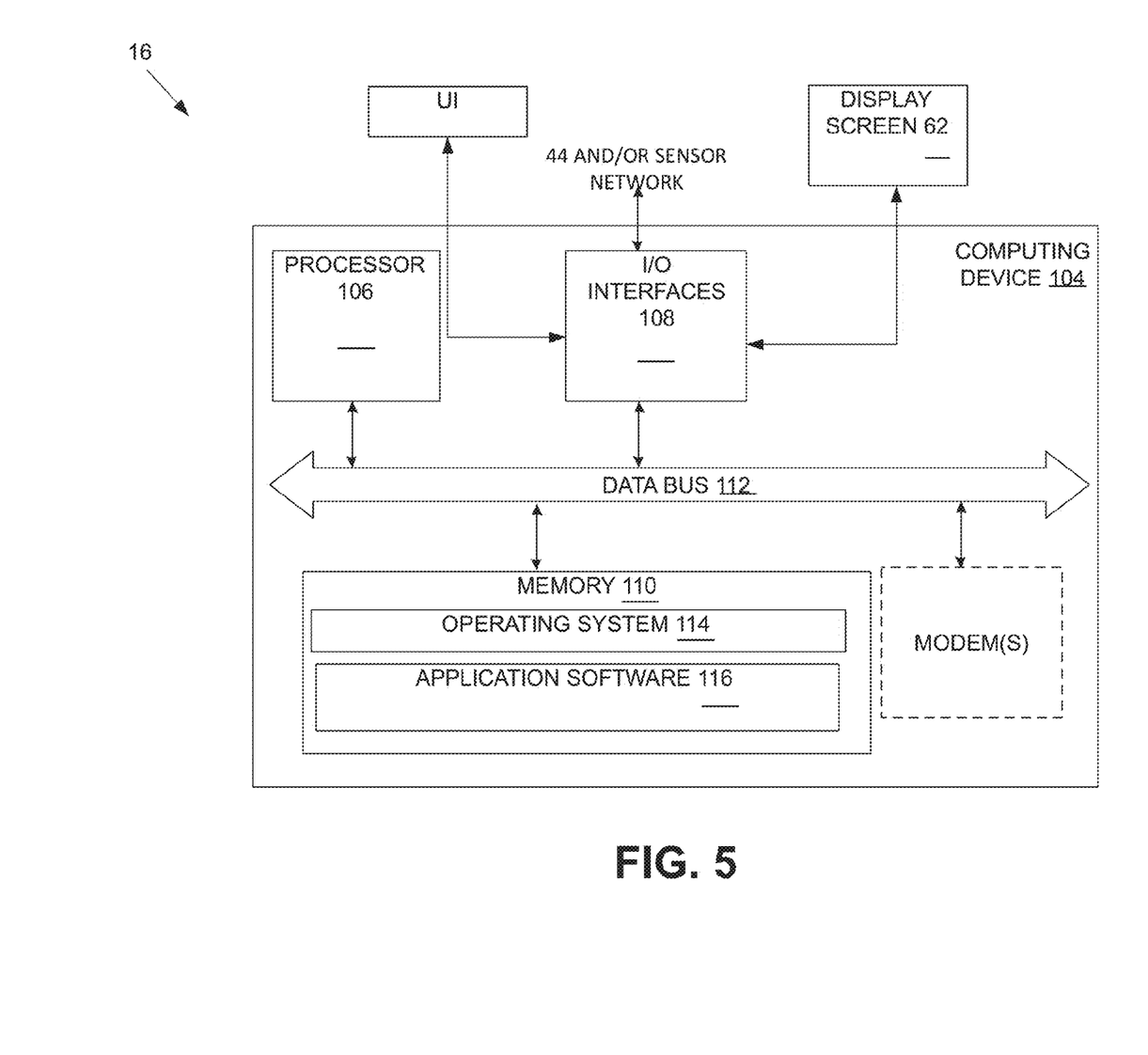
FIG. 5 is a block diagram of an embodiment of an example terminal used in an embodiment of a vehicle seat operation feedback and control system.

Having described certain features of an embodiment of a vehicle seat operation feedback and control system 10, attention is directed to FIG. 5, which illustrates an embodiment of the virtual terminal 16. One having ordinary skill in the art should appreciate in the context of the present disclosure that the example virtual terminal 16 is merely illustrative of one embodiment, and that some embodiments of virtual terminals comprise fewer or additional components, and/or some of the functionality associated with the various components depicted in FIG. 5 may be combined, or further distributed among additional modules or computing devices, in some embodiments. In one embodiment, the virtual terminal 16 comprises a display screen 62 and a computing device 104. The display screen 62 may be embodied as a touch screen-type display, though not limited to such a design. The display screen 62 may be configured according to any one of a variety of technologies, including cathode ray tube (CRT), liquid crystal display (LCD), plasma, haptic, among others well-known to those having ordinary skill in the art. As described previously, the display screen 62 may be embodied in a headset display, or on a portable communications device (e.g., smartphone, personal digital assistant (PDA), etc.). The computing device 104 is depicted in this example as a computer system, but in some embodiments may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the computing device 104. In one embodiment, the computing device 104 comprises one or more processors, such as processor 106, input/output (I/O) interface(s) 108, which in one embodiment is coupled to the display screen 62, and memory 110, all coupled to one or more data busses, such as data bus 112. Also shown is an optional modem(s) (e.g., cellular modem and/or radio modem) that enables, in association with local communications and/or browser software, access to a cellular network and the Internet or other networks (e.g., local networks). In some embodiments, the display screen 62 may be coupled directly to the data bus 112. The memory 110 may include any one or a combination of volatile memory elements (e.g., random-access memory RAM, such as DRAM, and SRAM, etc.) and nonvolatile memory elements (e.g., ROM, hard drive, tape, CDROM, etc.). The memory 110 may store a native operating system, one or more native applications, emulation systems, or emulated applications for any of a variety of operating systems and/or emulated hardware platforms, emulated operating systems, etc. In some embodiments, a separate storage device may be coupled to the data bus 112, such as a persistent memory (e.g., optical, magnetic, and/or semiconductor memory and associated drives).

In the embodiment depicted in FIG. 5, and with continued reference also to FIGS. 1-3, the memory 110 comprises an operating system 114 and application software 116. It should be appreciated by one having ordinary skill in the art in the context of the present disclosure that the computing device 104 may embody other mechanisms of control in some embodiments, such as a more rudimentary form of control where the operating system and/or application software are omitted. The application software 116 receives input via the I/O interfaces 108 from the controller 44 (FIG. 3) and/or sensor network as well as operator input (e.g., entered at the multi-functional handle 18, the display screen 62, the console 12, among other types of user interfaces). The application software 116 also renders a visual representation (e.g., graphics) of the seat 14A (FIG. 2) and a graphic of the condition and various components of the seat. The application software 116 also renders a location of one or more seat components for which an inoperable (or almost inoperable) and undesirable condition is detected, and further renders (textual) information that describes the conditions sensed at the seat 14A by the sensing network and/or controller 44. In some embodiments, the application software 116 extends the functionality of the controller 44, such as by providing a visual representation of the conditions detected, evaluated, and presented (albeit in a different format) by the controller 44. The application software 116 may maintain a data structure (e.g., database) in memory 110 that comprises information about the seat 14A and the corresponding functionality and/or use. For instance, the data structure in memory 110 may store historically-used and/or operator-configured settings for firmness and/or seat height, among other historical or operator-configured information pertaining to the seat 14A. In some embodiments, the data structure in memory 110 may store part numbers, vendor, service, or dealer information (e.g., contact names, phone numbers, email addresses, physical address, etc.). In some embodiments, one or more of the aforementioned information may be stored elsewhere in addition to, or in lieu of, its storage in memory 110, such as remotely (and hence accessed via the modem(s), or via wireless communication with an electronic device), in the seat 14A (e.g., memory of the controller 44), or on removable memory (e.g., memory stick). The application software 116 is configured to present to the operator the current (i.e., existing) settings for the various seat components (as indicated by the sensor network and/or controller 44) and recommendations for adjustments to those settings based on predetermined settings that are correlated to corrective actions for the current conditions or based on formulaic evaluation of the condition and corrective action. For instance, the application software 116 may comprise executable code that determines the damping correction to alleviate the sensed stroke travel to a suitable range according to well-known formulas. In some embodiments, the corrective action may be determined by the controller 44 and communicated to the application software 116 to visually present recommended corrective options to the operator. In some implementations, the application software 116 is merely conveying to the operator that options exist to a currently monitored condition, such as in response to sensing (e.g., by the presence sense 54) an operator that has sat down on the seat 14A. For instance, responsive to sensing the load on the seat 14A, the application software 116 presents to the operator options for seat adjustment and instructions as to where those settings are located and how to manipulate the various controls to change those settings. As another example, the damper sense 50 detects that the seat is moving only according to a minimal travel, the damper sense 50 (or controller 44) may signal to the application software 116 the current travel amount of the seat 14A, which triggers the application software 116 to render a graphic of the seat 14A, alert the operator of the minimal travel, and make suggestions about the firmness settings as well as instructions on how to decrease the firmness. The application software 116 may also present historical data corresponding to past settings. In addition, the application software 116 may also act automatically to address the condition, such as access vendor and part number information from memory 110 (or from the controller 44, or remotely) and communicate a purchase order to a vendor or dealer, or request a service call with or without intervention from the operator (e.g., when with intervention, affording permission grant or denial). Also, the application software 116 may cause actuation of a given component to address the condition automatically (with or without that the operator permission), such as to cause centering (or generally, adjustment, such as according to historical or operator desire) of the suspension stroke position, adjustment of seat height based on user profile, fluid speed change (e.g., for firmness), etc. In other words, the application software 116 may communicate commands to an actuator or other control associated with the suspension to cause adjustment of the associated seat component, or communicate to the controller 44, which in turn, signals the actuator or control to cause the automatic adjustment.

Execution of the application software 116 may be implemented by the processor 106 under the management and/or control of the operating system 114. In some embodiments, the operating system 114 may be omitted and a more rudimentary manner of control implemented. The processor 106 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 104.

The I/O interfaces 108 comprise hardware and/or software to provide one or more interfaces to a network within the vehicle, such as one or more CAN busses. In other words, the I/O interfaces 108 may comprise any number of interfaces for the input and output of signals (e.g., analog or digital data) for conveyance of information (e.g., data) over such local networks. For instance, as described above, the I/O interfaces 108 enable communication between the computing device 104, the sensor network, and the controller 44, as well as in some embodiments the display screen 62. The I/O interfaces 108 also enable input via other user interfaces, such as a keyboard, mouse, microphone, steering wheel, multi-functional handle 18 (FIG. 1), or other devices (e.g., switches, immersive head set, etc.) that enable input and/or output by an operator (e.g., to respond to indications presented on the screen or audibly presented when not responding directly using the display screen 62).

When certain embodiments of the computing device 104 are implemented at least in part with software (including firmware), as depicted in FIG. 5, it should be noted that the software (e.g., such as the application software 116) can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing device 104 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), relays, contactors, etc.

Figure 6:
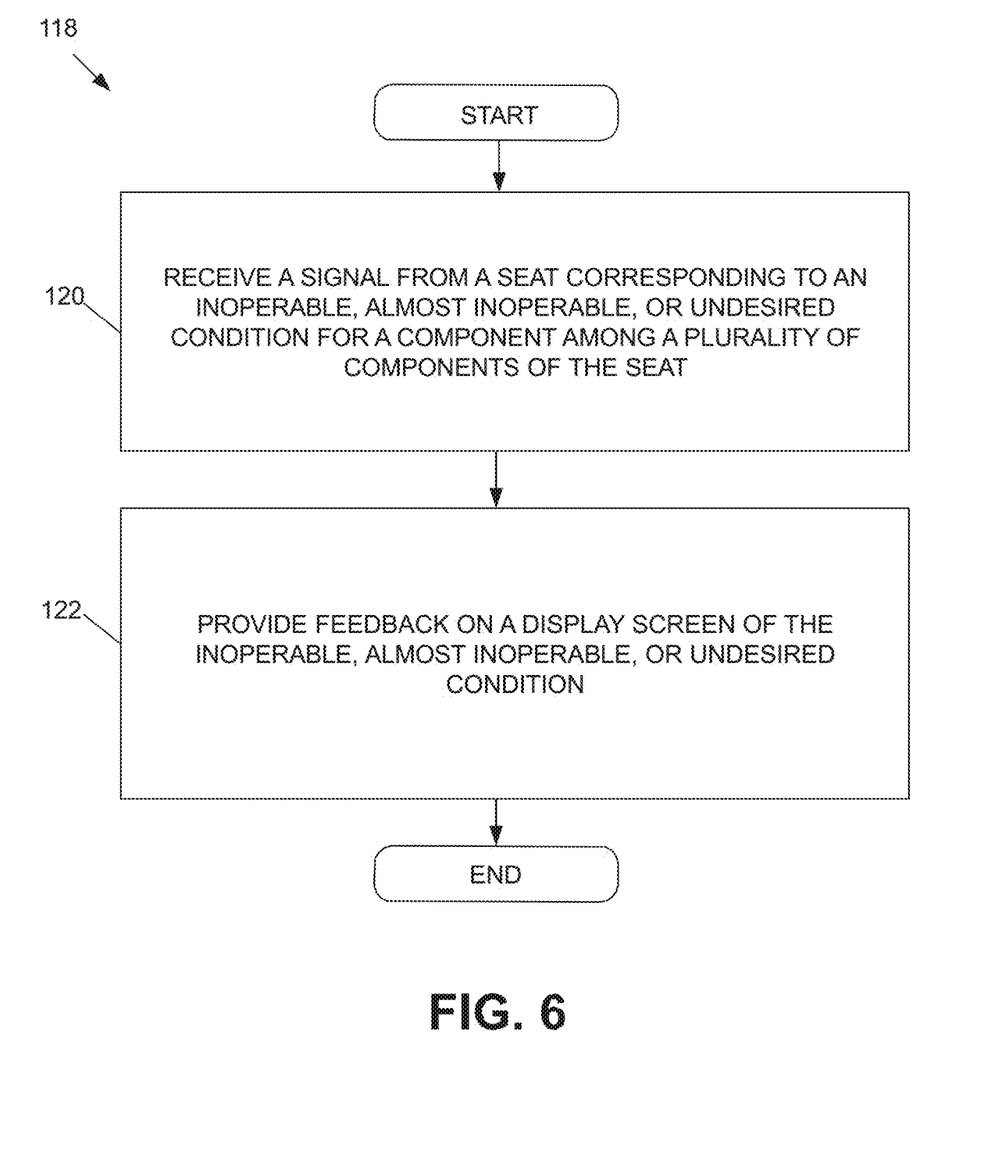
FIG. 6 is a flow diagram that illustrates an embodiment of an example vehicle seat operation feedback and control method.

In view of the above description, it should be appreciated that one embodiment of an example vehicle seat operation feedback and control method 118, as depicted in FIG. 6, comprises: receiving a signal from a seat corresponding to an inoperable, almost inoperable, or undesired condition for a component among a plurality of components of the seat (120); and providing feedback on a display screen of the inoperable, almost inoperable, or undesired condition (122).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

Note that although a focus in the description below pertains to the suspension, it should be appreciated that certain embodiments of a vehicle seat operation feedback and control system may provide feedback of a plurality of different seat functionality, such as feedback pertaining to an identification of conditions and/or how to make lumbar adjustments, armrest adjustments, recliner adjustments, fore-and-aft slide adjustments, fore-and-aft and lateral isolation adjustments, cushion tilt adjustments, seat swivel adjustments, seat cushion extension adjustments, among seat functionality.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the systems and methods have been described with reference to the example embodiments illustrated in the attached drawing figures, it is noted that equivalents may be employed and substitutions made herein without departing from the scope of the disclosure as protected by the following claims.

The invention claimed is:

1. A vehicle seat operation feedback and control system, comprising:
    a seat with a plurality of components;
    an electronic device comprising a display screen; and
    a processor configured to:
        receive a signal from the seat corresponding to an inoperable, almost inoperable, or undesired condition for a component among the plurality of components, wherein the inoperable, almost inoperable, or undesired condition corresponds to a suspension position of the seat; and
        provide feedback on the display screen of the inoperable, almost inoperable, or undesired condition.

2. The system of claim 1, wherein the components are mechanical components, electrical components, or a combination of electrical and mechanical components.

3. The system of claim 1, further comprising a plurality of sensors associated with the plurality of components, the plurality of sensors communicatively coupled to the processor.

4. The system of claim 1, wherein the processor is configured to provide feedback by presenting one or any combination of a graphic of the seat and an identification of the component having the inoperable, almost inoperable, or undesired condition on the display screen, to a remote device, or to a combination of the display screen and the remote device and text identifying the component having the inoperable, almost inoperable, or undesired condition.

5. The system of claim 1, wherein the processor is further configured to provide component information and replacement part information on the display screen, to a remote device, or to both the display screen and the remote device.

6. The system of claim 1, further comprising a receiver coupled to the processor, wherein the seat further comprises a wireless transmitter, the receiver configured to wirelessly receive the signal from the transmitter in response to an indication of the inoperable, almost inoperable, or undesired condition.

7. The system of claim 1, wherein the plurality of components are connected to the processor via a wired medium.

8. The system of claim 7, wherein the wired medium comprises a controller area network bus.

9. The system of claim 1, wherein the processor is further configured to determine whether or not to present the feedback or ignore the signal.

10. The system of claim 1, wherein the electronic device comprises a terminal, a headset, or a mobile communications device.

11. The system of claim 1, wherein the feedback comprises instructions to adjust the suspension position or a request for permission to automatically adjust the suspension position.

12. The system of claim 1, wherein the processor is further configured to automatically center the suspension position, automatically position the suspension position to a historically-used position, or automatically position the suspension position to an operator-desired position.

13. A vehicle seat operation feedback and control system, comprising:
a seat with a plurality of components;
an electronic device comprising a display screen; and
a processor configured to:
receive a signal from the seat corresponding to an inoperable, almost inoperable, or undesired condition for a component among the plurality of components, wherein the inoperable, almost inoperable, or undesired condition corresponds to a seat position at or near maximum range of operation or to a seat position that is too firm and operating in a limited range of suspension stroke; and
provide feedback on the display screen of the inoperable, almost inoperable, or undesired condition.

14. The system of claim 13, wherein the feedback comprises instructions to adjust seat firmness settings or a request for permission to automatically adjust seat firmness.

15. The system of claim 13, wherein the processor is further configured to automatically adjust seat firmness to a processor-determined firmness, automatically adjust the seat firmness to a historically-used firmness, or automatically adjust seat firmness to an operator-desired firmness.

16. An apparatus, comprising:
a display screen; and
a processor configured to:
receive a signal corresponding to an inoperable, almost inoperable, or undesired condition for a seat component among the plurality of seat components; and
provide feedback on the display screen of the inoperable, almost inoperable, or undesired condition, wherein the undesired condition corresponds to one or a combination of:
a suspension position of the seat, wherein the feedback comprises instructions to adjust the suspension position or a request for permission to automatically adjust the suspension position; and
a seat position either at or near maximum range of operation or changing height in a limited range of operation, wherein the feedback comprises instructions to adjust seat firmness settings or a request for permission to automatically adjust seat firmness.

17. The apparatus of claim 16, wherein the processor is configured to provide feedback by presenting either a graphic of the seat and an identification of the seat component having the inoperable, almost inoperable, or undesired condition or textual information that describes an identification of the seat component having the inoperable, almost inoperable, or undesired condition without showing a graphic of the seat or the seat component.

* * * * *